(12) United States Patent
Gobara

(10) Patent No.: US 8,154,453 B2
(45) Date of Patent: Apr. 10, 2012

(54) POSITIONING METHOD, PROGRAM THEREOF, AND POSITIONING DEVICE

(75) Inventor: Naoki Gobara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 263 days.

(21) Appl. No.: 12/428,885

(22) Filed: Apr. 23, 2009

(65) Prior Publication Data

US 2009/0284414 A1 Nov. 19, 2009

(30) Foreign Application Priority Data

May 14, 2008 (JP) ................................. 2008-127302

(51) Int. Cl.
*G01S 3/28* (2006.01)

(52) U.S. Cl. ....................................................... 342/378

(58) Field of Classification Search ............. 342/257.12, 342/357.26, 357.27, 357.37, 357.38, 357.62, 342/357.63, 357.68, 357.69, 357.76, 357.77; 375/142, 150; 455/231, 456.1
See application file for complete search history.

(56) References Cited

U.S. PATENT DOCUMENTS

| | | | |
|---|---|---|---|
| 6,377,615 B1 * | 4/2002 | Sourour et al. | 375/150 |
| 6,959,053 B2 * | 10/2005 | Gerhards et al. | 375/343 |
| 2005/0031043 A1 * | 2/2005 | Paquelet | 375/259 |
| 2007/0072567 A1 * | 3/2007 | Nagai et al. | 455/205 |
| 2008/0068258 A1 * | 3/2008 | Maezawa et al. | 342/357.03 |
| 2008/0234930 A1 * | 9/2008 | Cheok et al. | 701/207 |

FOREIGN PATENT DOCUMENTS

| | | | |
|---|---|---|---|
| JP | 2000-312163 A | 11/2000 |
| JP | 2001-153942 A | 6/2001 |
| JP | 2004-012380 A | 1/2004 |
| JP | 2005-260781 A | 9/2005 |

* cited by examiner

*Primary Examiner* — Harry Liu

(74) *Attorney, Agent, or Firm* — Global IP Counselors, LLP

(57) ABSTRACT

A positioning method includes: executing a first correlation accumulation process on a received signal, a positioning signal spread-modulated with a spread code, and a replica code of the spread code while shifting a phase of the replica code in a first phase search range, setting a second phase search range narrower than the first range based on an accumulated correlation value at a first timing in the first correlation accumulation process, executing a second correlation accumulation process on the received signal and the replica code while shifting the phase of the replica code in the second phase search range, determining appropriateness of the second phase search range based on the accumulated correlation value at the first timing and an accumulated correlation value at a second timing in the first correlation accumulation process, and positioning using a result of the second correlation accumulation process, if the second phase search range is determined appropriate.

7 Claims, 7 Drawing Sheets

| CAPTURING OBJECT SATELLITES (2511) | FIRST CORRELATION ACCUMULATION PROCESSING DATA (2512) | | | SECOND CORRELATION ACCUMULATION PROCESSING DATA (2513) | | | PROCESSING STATUS (2514) | APPROPRIATENESS DETERMINING CODE PHASE (2515) | | PSEUDO DISTANCE CODE PHASE (2516) |
|---|---|---|---|---|---|---|---|---|---|---|
| | FIRST ACCUMULATED CORRELATION VALUE DATA TABLE | FIRST ACCUMULATION BASE TIME | FIRST ACCUMULATION TIME | SECOND ACCUMULATED CORRELATION VALUE DATA TABLE | SECOND ACCUMULATION BASE TIME | SECOND ACCUMULATION TIME | | INITIAL CODE PHASE | CONFIRMATION CODE PHASE | |
| SV1 | Table11 | T11 | t11 | Table12 | T12 | t12 | FIRST AND SECOND PROCESSES ARE IN PROGRESS | C1 | C1 | C15 |
| SV3 | Table31 | T31 | t31 | — | — | — | FIRST PROCESS IS IN PROGRESS | — | — | — |
| SV6 | — | — | — | — | — | — | NO PROCESS IS IN PROGRESS | — | — | — |
| ... | ... | ... | ... | ... | ... | ... | ... | ... | ... | ... |

FIG. 6

POSITIONING METHOD, PROGRAM THEREOF, AND POSITIONING DEVICE

Japanese Patent Application No. 2008-127302 filed on May 14, 2008, is hereby incorporated by reference in its entirety.

BACKGROUND

1. Technical Field

The present invention relates to a positioning method, a program of the positioning method, and a positioning device.

2. Related Art

As a positioning system using a positioning signal, a global positioning system (GPS) is widely known, and is used as a positioning device incorporated in, for example, a portable phone or a vehicle navigation system. In GPS, the positioning calculation is performed for obtaining values of four parameters, namely three-dimensional coordinate values representing the location of the device and a clock error, based on the information such as the locations of a plurality of GPS satellites or pseudo-ranges between the GPS satellites and the device, thereby positioning the present location of the device.

In the positioning system described above, in order for extracting and capturing the positioning signal from a received signal, there is generally used a method of executing correlation calculation between the received signal which is spread-modulated with a type of spread codes known as a PRN code, and a replica code of the PRN code, and then detecting a code phase with a maximum correlation value. However, if the code phase fails to be correctly detected, it is not possible to correctly obtain the pseudorange used in the positioning calculation, which causes degradation of positioning accuracy.

Therefore, for example, JP-A-2000-312163 (Document 1) discloses a technology in which the correlation calculation between the received signal and each of a plurality of replica codes of the PRN codes, the phase of which changes every chip, (hereinafter referred to as the "first correlation calculation") is executed to obtain the phase search range expected to maximize the correlation value, and further, the correlation calculation between the received signal and each of a plurality of replica codes, the phase of which changes every 0.1 chip, is executed, thereby detecting the code phase.

In the technology disclosed in the Document 1, the correlation calculation is performed with different resolutions, thereby achieving improvement of detection accuracy of the code phase. However, in such an environment as an indoor environment in which the positioning signal thus received is in a weak electric field, it is difficult to detect a correlation maximum value in a weak signal, and in some cases, a correlation value once determined to be the maximum value in the first correlation calculation is not a true maximum value.

In this case, since the second correlation calculation is executed with a higher resolution in the phase search range thus set based on the correlation value, which is not the true maximum value (wrong phase search range), in the technology described above, there arises a problem that it is not possible to correctly detect the code phase, resulting in degradation of the positioning accuracy.

SUMMARY

An advantage of some aspects of the invention is to improve the detection accuracy of the code phase, thereby improving the positioning accuracy.

A positioning method according to a first aspect of the invention includes: executing a first correlation accumulation process adapted to execute a correlation accumulation on a received positioning signal spread-modulated with a spread code and a replica code of the spread code while shifting a phase of the replica code in a first phase search range, setting a second phase search range narrower than the first phase search range based on an accumulated correlation value at a first timing in the first correlation accumulation process, executing a second correlation accumulation process adapted to execute correlation accumulation on the received signal and the replica code while shifting the phase of the replica code in the second phase search range, determining appropriateness of the second phase search range set in the setting step, based on the accumulated correlation value at the first timing and an accumulated correlation value at the second timing that is subsequent to the first timing in the first correlation accumulation process, and positioning by executing a predetermined positioning calculation using a processing result of the second correlation accumulation process, if the second phase search range is determined appropriate.

Further, a positioning device according to an eighth aspect of the invention includes a first correlation accumulation processing section adapted to execute a first correlation accumulation process of executing correlation accumulation on a received positioning signal spread-modulated with a spread code and a replica code of the spread code while shifting a phase of the replica code in a first phase search range, a phase search range setting section adapted to set a second phase search range narrower than the first phase search range based on an accumulated correlation value at a first timing in the first correlation accumulation process, a second correlation accumulation processing section adapted to execute a second correlation accumulation process of executing a correlation accumulation on the received signal and the replica code while shifting the phase of the replica code in the second phase search range, a determination section adapted to determine appropriateness of the second phase search range set by the phase search range setting section, based on the accumulated correlation value at the first timing and an accumulated correlation value at the second timing subsequent to the first timing in the first correlation accumulation process, and a positioning section adapted to position, if the second phase search range is determined appropriate, by executing a predetermined positioning calculation using a processing result of the second correlation accumulation process.

According to these aspects of the invention, the first correlation accumulation process is executed by correlating and accumulating the received positioning signal spread-modulated with a spread code and the replica code of the spread code while shifting the phase of the replica code in the first phase search range. The second phase search range narrower than the first phase search range is set based on an accumulated correlation value at the first timing during the first correlation accumulation process. The second correlation accumulation process is executed by correlating and accumulating the received signal and the replica code while shifting the phase of the replica code in the second phase search range. Appropriateness of the second phase search range thus set is determined based on the accumulated correlation value at the first timing and an accumulated correlation value at the second timing subsequent to the first timing in the first correlation accumulation process. If the second phase search range is determined appropriate, the predetermined positioning calculation is executed using the processing result of the second correlation accumulation process. The process described above enables to accurately determine appropriateness of the range in which the search of the phase is presently in progress, thereby realizing the positioning with high accuracy based on the accurate processing result.

Further, as a second aspect of the invention, it is possible to configure the positioning method which includes, in addition to the first aspect of the invention, the step of positioning by executing the predetermined positioning calculation based on an accumulated correlation value obtained in the first correlation accumulation process after the first timing until the second phase search range is determined appropriate in the determining step.

According to the second aspect of the invention, a predetermined positioning calculation is executed based on the accumulated correlation value obtained in the first correlation accumulation process after the first timing until the second phase search range is determined appropriate, thereby performing positioning. Thus, it becomes possible to continuously perform the positioning using the processing result of the first correlation accumulation process in a complementary manner even in the period in which the processing result of the second correlation accumulation process is not available.

Further, as a third aspect of the invention, in the first or the second aspects of the invention, it is possible that the first correlation accumulation process is a process of executing the correlation accumulation while shifting the phase of the replica code by a first unit phase interval, and the second correlation accumulation process is a process of executing the correlation accumulation while shifting the phase of the replica code by a second unit phase interval narrower than the first unit phase interval.

According to the third aspect of the invention, since the correlation accumulation is executed with a narrower unit phase interval in the second correlation accumulation process compared to the first correlation accumulation process, it is possible to realize the phase search with a higher resolution.

Further, as a fourth aspect of the invention, it is possible to configure the positioning method which includes, in addition to any one of the first through third aspects of the invention, the step of newly setting the second phase search range based on the accumulated correlation value in the first correlation accumulation process if the second phase search range is determined inappropriate in the determining step.

According to the fourth aspect of the invention, if it is determined that the processing result of the second correlation accumulation process is not appropriate, the second phase search range is newly set based on an accumulated correlation value in the first correlation accumulation process. Thus, even if the second phase search range set initially is a wrong search range, it becomes possible to appropriately reset the search range to execute the phase search again.

Further, as a fifth aspect of the invention, in the positioning method according to any one of the first through fourth aspects of the invention, it is possible that in the determining step, appropriateness of the second phase search range set in the setting step is determined based on whether or not a phase with a maximum accumulated correlation value of the first timing and a phase with a maximum accumulated correlation value of the second timing in the first correlation accumulation process satisfy a predetermined approximation condition.

According to the fifth aspect of the invention, appropriateness of the second phase search range set in the setting step is determined based on whether or not the phase with a maximum accumulated correlation value of the first timing and the phase with a maximum accumulated correlation value of the second timing in the first correlation accumulation process satisfy a predetermined approximation condition.

Further, as a sixth aspect of the invention, in the positioning method according to any one of the first through fifth aspects of the invention, it is possible that in the setting step, a predetermined range including a phase with a maximum accumulated correlation value of the first correlation accumulation process is set as the second phase search range.

According to the sixth aspect of the invention, the predetermined range including the phase with the maximum accumulated correlation value of the first correlation accumulation process is set as the second phase search range.

Further, as a seventh aspect of the invention, it is also possible to configure a program for allowing a computer incorporated in a positioning device to execute the positioning method of any one of the first through sixth aspect of the invention.

BRIEF DESCRIPTION OF THE DRAWINGS

The invention will now be described with reference to the accompanying drawings, wherein like numbers reference like elements.

FIG. 6 is a diagram showing an example of a data configuration of a correlation accumulation value database.

DESCRIPTION OF EXEMPLARY EMBODIMENTS

Hereinafter, preferred embodiments of the invention will be described with reference to the accompanying drawings. It should be noted that although a portable phone will be exemplified as an electronic apparatus equipped with a positioning device, and the case in which the GPS is used as the positioning system will be explained, the embodiment to which the invention can be applied is not limited thereto.

1. Functional Configuration

Figure 1:
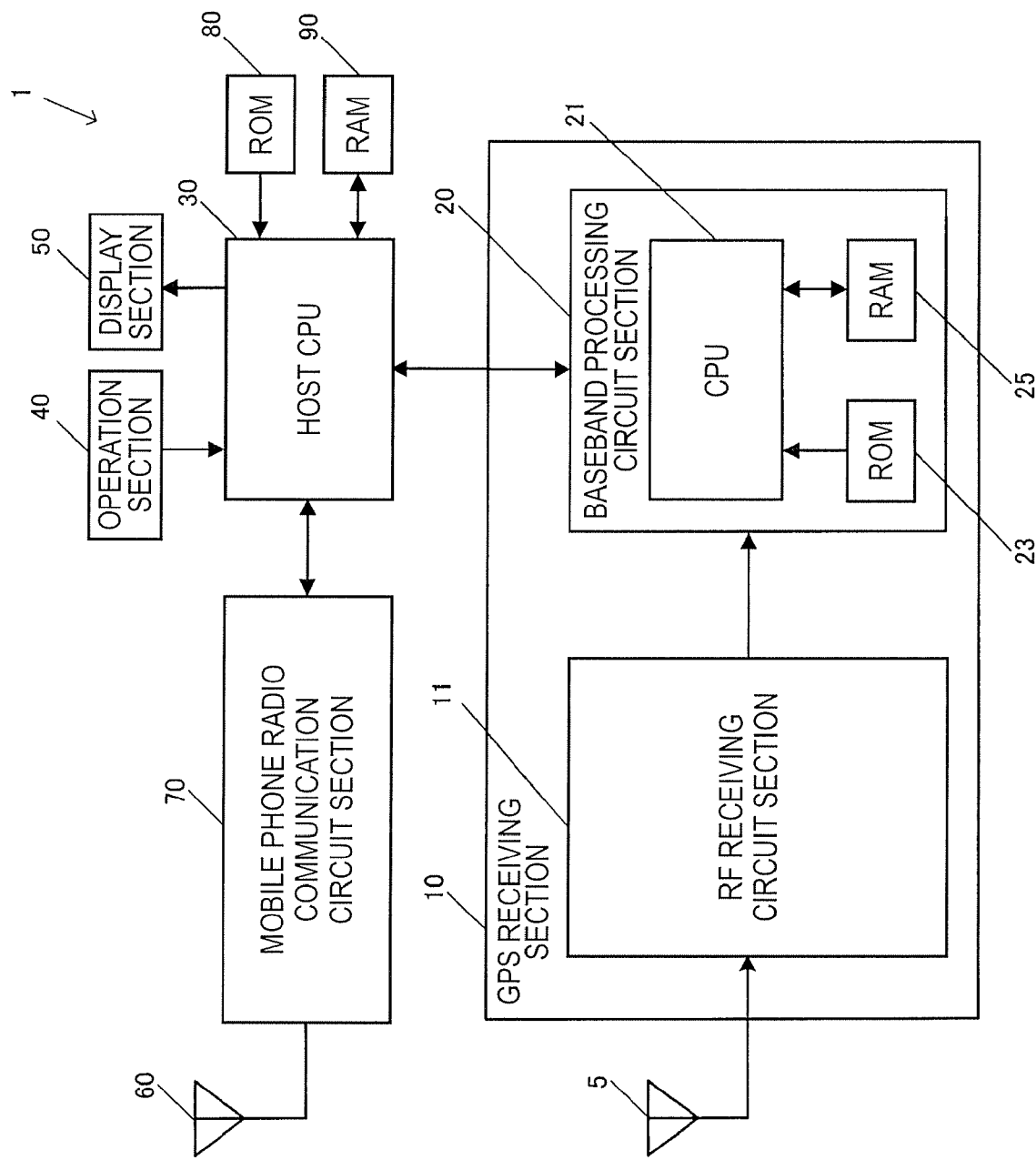
FIG. 1 is a block diagram showing a functional configuration of a portable phone.

FIG. 1 is a block diagram showing a functional configuration of a portable phone 1 as an embodiment according to the invention. The portable phone 1 is configured including a GPS antenna 5, a GPS receiving section 10, a host central processing unit (CPU) 30, an operation section 40, a display section 50, a mobile phone antenna 60, a mobile phone radio communication circuit section 70, a read only memory (ROM) 80, and a random access memory (RAM) 90.

The GPS antenna 5 is an antenna for receiving radio frequency (RF) signals including the GPS satellite signal transmitted from GPS satellites, and outputs the signals, thus received, to the GPS receiving section 10. It should be noted that the GPS satellite signal is a communication signal of 1.57542 GHz modulated by the direct sequence spread spectrum method with the pseudo random noise (PRN) code, which is a type of spread code different between the satellites. The PRN code is a pseudo random noise code having a code length of 1023 chips as 1 PN frame and a repetition period of 1 millisecond (ms).

The GPS receiving section 10 is a positioning circuit for positioning the present location of the portable phone 1 based on the signal output from the GPS antenna 5, and is a functional block corresponding to a so-called GPS receiver. The GPS receiving section 10 is configured including an RF receiving circuit section 11, and a baseband processing circuit section 20. It should be noted that the RF receiving circuit section 11 and the baseband processing circuit section 20 can be manufactured separately as discrete large scale integration circuits (LSI), or manufactured integrally as one chip.

The RF receiving circuit section 11 is a processing circuit block for RF signals, and for dividing or multiplying a predetermined locally-oscillated signal, thereby generating the oscillation signal for RF signal multiplication. Further, the RF receiving circuit section 11 multiplies the RF signal output from the GPS antenna 5 by the oscillation signal thus generated, thereby down-converting the RF signal into a signal (hereinafter referred to as an "intermediate frequency (IF) signal") with an intermediate frequency, then amplifies the IF signal, then converts it into a digital signal with an A/D converter to output the digital signal to the baseband processing circuit section 20.

The baseband processing circuit section 20 is a circuit section for executing correlation processing or the like on the signal output from the RF receiving circuit section 11 to capture and extract the GPS satellite signal, and decoding the data to retrieve a navigation message, time information, and so on, thereby performing the positioning calculation. The baseband processing circuit section 20 is configured including a CPU 21 as a processor, and a ROM 23 and a RAM 25 as memories.

The host CPU 30 is a processor for integrally controlling each of the sections of the portable phone 1 along various kinds of programs such as a system program stored in the ROM 80. The host CPU 30 displays the navigation screen plotting the positioning location input from the CPU 21 on the display section 50.

The operation section 40 is an input device composed, for example, of a touch panel and button switches, and outputs to the host CPU 30 the signals corresponding to the icons and buttons held down. By operating the operation section 40, various kinds of instruction inputs such as a call request, transmission or reception request of an electronic mail, or an activate request of GPS are executed.

The display section 50 is a display device composed of a liquid crystal display (LCD) or the like, and executing various types of display based on the display signal input from the host CPU 30. On the display section 50, the navigation screen, the time information, and so on are displayed.

The mobile phone antenna 60 is an antenna for performing transmission and reception of the mobile phone radio communication signal and various data with the wireless base stations installed by the communication service company of the portable phone 1.

The mobile phone radio communication circuit section 70 is a communication circuit section of the mobile phone mainly composed of an RF conversion circuit, a baseband processing circuit, and so on, and executes modulation and demodulation on the mobile phone radio signal, thereby realizing phone calls, transmission and reception of the electronic mails, and so on.

The ROM 80 is a read only nonvolatile storage device, and stores a system program for the host CPU 30 to control the portable phone 1, various programs and data for the host CPU 30 to realize a navigation function, and so on.

The RAM 90 is a readable/writable volatile memory, and forms a work area for temporarily storing the system program, and various types of processing programs executed by the host CPU 30, and in-process data and process results of the various types of processes.

2. Data Configuration

Figure 2:
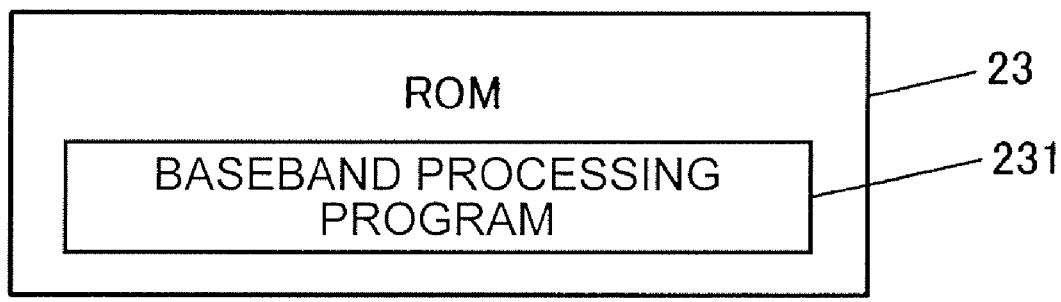
FIG. 2 is a diagram showing an example of data stored in a ROM of a baseband processing circuit section.

FIG. 2 is a diagram showing an example of the data stored in the ROM 23 in the baseband processing circuit section 20. The ROM 23 stores a baseband processing program 231 retrieved by the CPU 21 and executed as the baseband process (see FIGS. 7 and 8).

The baseband process denotes a process in which the CPU 21 executes the first correlation accumulation process and the second correlation accumulation process for each of the GPS satellite (hereinafter referred to as "capturing object satellites") to be the capturing objects to determine the phase (a so-called code phase) of the PRN code in the received signal as a pseudo distance code phase, and executes a predetermined positioning calculation using the pseudo distance obtained based on the pseudo distance code phase, thereby positioning the present location of the portable phone 1.

Specifically, the CPU 21 performs a process of executing the correlation calculation between the received signal and the replica code while modifying the frequency of the generation signal of the replica code and the phase of the replica code, thereby obtaining the correlation values, and accumulating the correlation values. The replica code denotes a signal generated spuriously for simulating the PRN code included in the satellite signal of the capturing object satellite. When the frequency of the generation signal of the replica code and the frequency of the received signal match with each other, and the phase of the replica code and the phase of the PRN code of the received signal match with each other, the correlation value and the accumulated correlation value become the maximum. Hereinafter, explanations will be presented with a focus on the correlation calculation in the phase direction while omitting an explanation of the correlation calculation in the frequency direction.

Since the GPS satellite signal has been repeatedly modulated with the PRN code, the PRN codes are sequentially arranged between the GPS satellite and the portable phone 1. However, the distance from the GPS satellite to the portable phone 1 does not necessarily become an integer number multiplied by the length of the PRN code, and there is a fractional part. In the correlation accumulation process, the code length corresponding to the fractional part is detected as the code phase of the PRN code. On this occasion, the length obtained by adding the integer number multiplied by the length of the PRN code to the fractional part corresponds to the pseudo distance between the GPS satellite and the portable phone 1.

Figure 4:
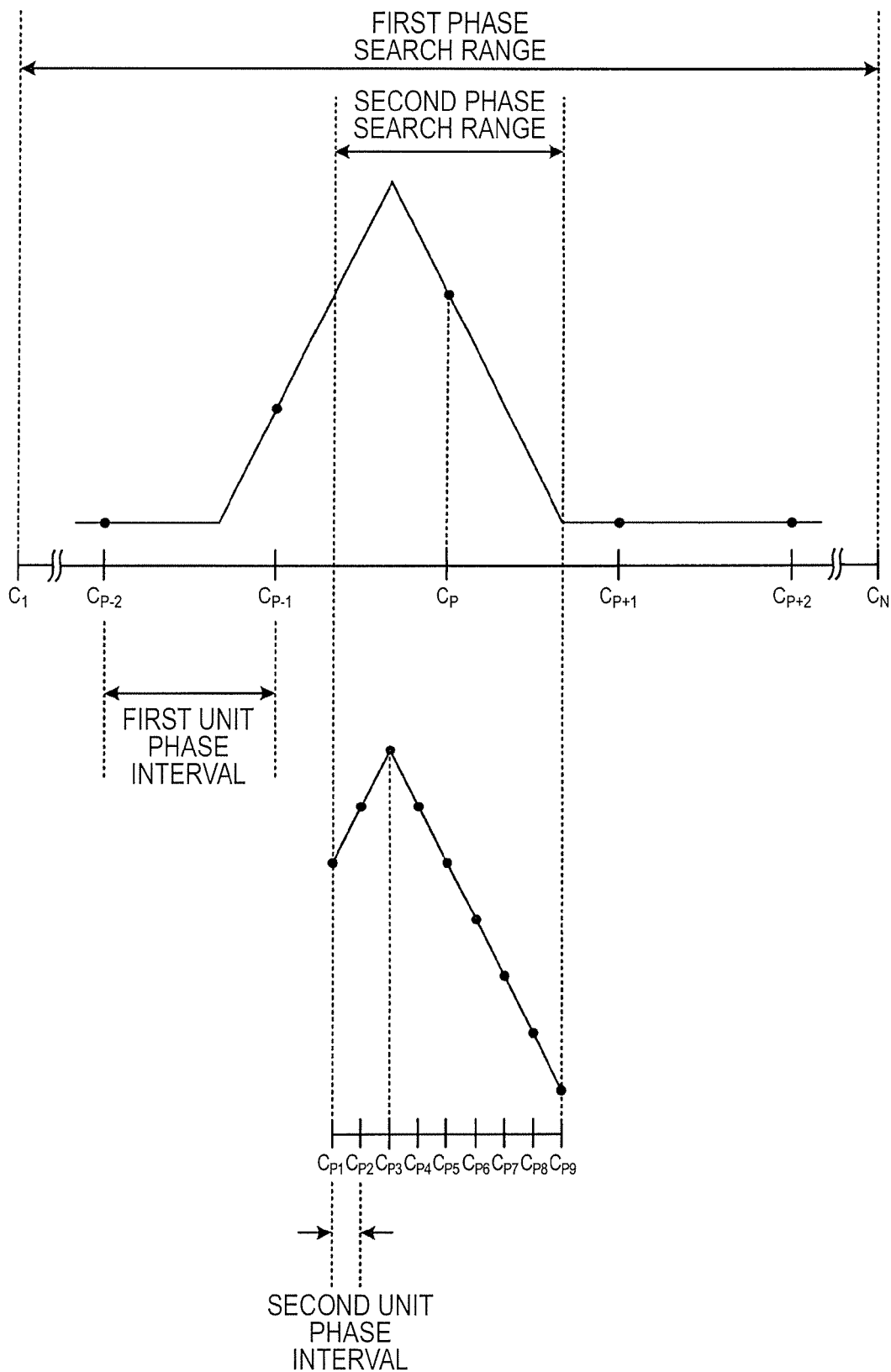
FIG. 4 is a diagram schematically showing a first correlation accumulation process and a second correlation accumulation process.
Figure 5:
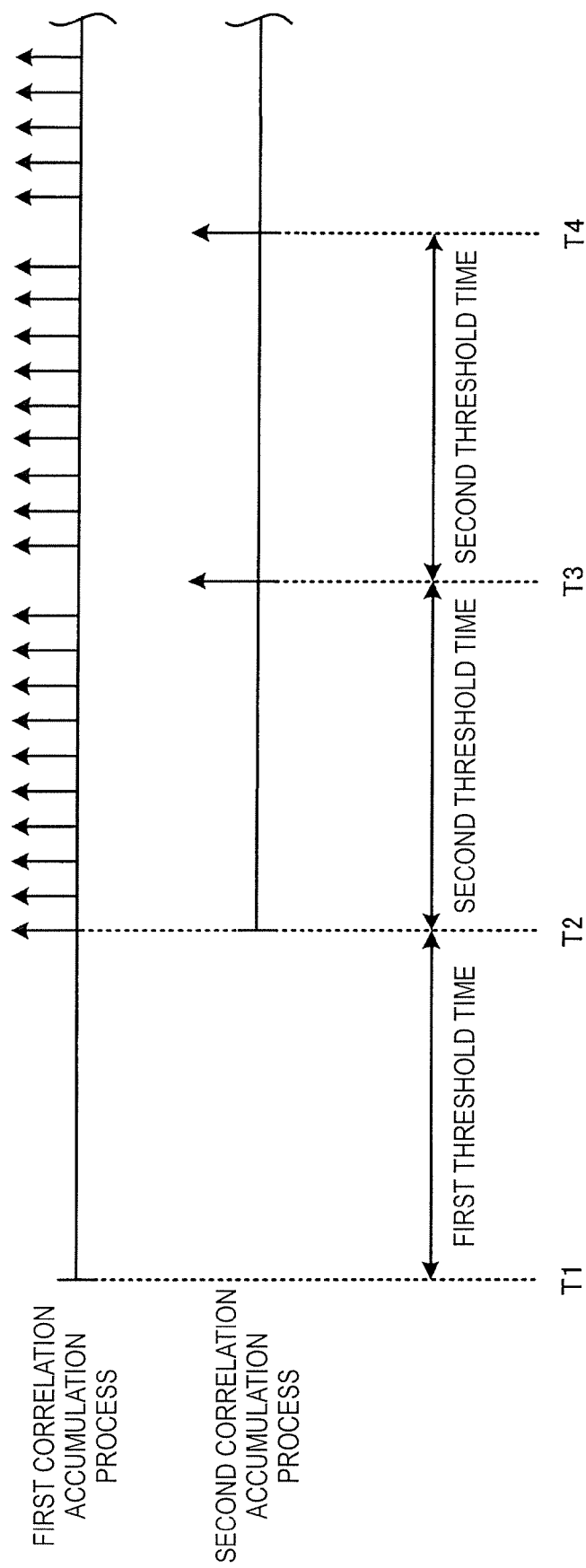
FIG. 5 is a diagram showing the time-line of the first correlation accumulation process and the second correlation accumulation process.

FIG. 4 is a diagram schematically showing the first correlation accumulation process and the second correlation accumulation process in the present embodiment. In FIG. 4, the horizontal axis represents the code phase, and the vertical axis represents the accumulated correlation value. Further, FIG. 5 is a diagram showing the time-line of the first correlation accumulation process and the second correlation accumulation process in the present embodiment. In FIG. 5, the upper column shows the first correlation accumulation process, the lower column shows the second correlation accumulation process, and the lateral axis represents time. Further, the up-arrow represents the fact that the code phase (the pseudo distance code phase) at the time point at which the arrow is provided is specified using the accumulated correlation value at the time point, then the pseudo distance has been calculated, and the positioning calculation has been executed.

In the first correlation accumulation process, the correlation calculation of the received signal and the replica code is executed in a first phase search range while shifting the phase of the replica code by a first unit phase interval. Then, the process of executing a synchronous accumulation on the correlation value is performed. More specifically, the correlation value obtained by each of the correlation calculations is not accumulated directly. The reason is that, although the time interval is very small, each of the correlation calculations is executed in a time-series manner. Therefore, the value obtained by each of the correlation calculations contains as much shift in code phase corresponding to the signal speed (=the light speed).

To accommodate with such shift, the distance-equivalent value obtained by multiplying the time difference between the time point at which the correlation calculation is executed and a predetermined accumulation base time (the latest correlation calculation time in the present embodiment) by light speed is converted into the phase shift in the PRN code. Further, by correcting the value obtained by the correlation calculation as much as the phase shift thus calculated, the value as if obtained by executing the correlation calculation at the predetermined accumulation base time can be obtained. Then, the values thus corrected are accumulated. The series of processes are called "synchronous accumulation."

Then, when the elapsed time from the time when the accumulation is first started in the first correlation accumulation process has reached a first threshold time (e.g., "16 seconds") (hereinafter referred to as "first accumulation time"), the second correlation accumulation process is started while the first correlation accumulation process continues. In the second correlation accumulation process, the process of executing the correlation calculation of the received signal and the replica code in a second phase search range while shifting the phase of the replica code by a second unit phase interval.

The second phase search range is set to be narrower than the first phase search range based on the processing result of the first correlation accumulation process at the timing at which the first accumulation time reaches the first threshold time (hereinafter referred to as a "first timing"). More specifically, a predetermined range including the phase having the maximum accumulated correlation value at the first timing is set as the second phase search range. Further, the second unit phase interval is set to be narrower than the first unit phase interval. Therefore, in the second correlation accumulation process, it is arranged that the search of the code phase is performed with an increased resolution in the phase search range narrower than the one in the first correlation accumulation process.

For example, as shown in FIG. 4, the entire 1023 chips as the code length of the PRN code are set as the first phase search range, and the phase interval in the case of sectioning the PRN code into N ($N \geq 1023$) is set as the first unit phase interval. Then, the correlation accumulation is executed in the first phase search range while shifting the phase of the replica code by the first unit phase interval. As a result, in FIG. 4, the accumulated correlation value becomes the maximum at the code phase "$C_P$" at the first timing.

In this case, the phase range ($C_{P1} \leq C \leq C_{P9}$) centering on the code phase "$C_P$," and having the lower limit of "$C_{P1}(>C_{P-1})$" and the upper limit of "$C_{P9}(<C_{P+1})$", for example, is set as the second phase search range. Further, the second unit phase interval (e.g., a tenth of the first unit phase interval) narrower than the first unit phase interval is set. Then, the correlation accumulation is executed in the second phase search range while shifting the phase of the replica code by the second unit phase interval. As a result, it is understood in FIG. 4 that the accumulated correlation value takes the maximum value at the code phase "$C_{P3}$," and the code phase is detected with a resolution higher than that in the first correlation accumulation process.

Further, what is characteristic of the present embodiment is the fact that the first correlation accumulation process is continued while the second correlation accumulation process is being executed. Further, the whether or not the second phase search range thus set is appropriate is periodically determined, and if it is determined that it is not appropriate, the second phase search range is newly set, and the second correlation accumulation process is executed again from the beginning.

Specifically, the code phase with the maximum accumulated correlation value is acquired and stored as an "initial code phase" at the first timing. Further, at every timing of executing the positioning (hereinafter referred to as a "second timing"), the code phase with the maximum accumulated correlation value is acquired as a "confirmation code phase" in the first correlation accumulation process at the second timing, and whether or not the initial code phase and the confirmation code phase match with each other is determined. Then, if it is determined that they match with each other, it is determined that the second phase search range thus set is appropriate. On the other hand, if the initial code phase and the confirmation code phase do not match each other, it is determined that the second phase search range thus set is inappropriate, and the second phase search range is newly set based on the confirmation code phase.

This is because if the initial code phase and the confirmation code phase match with each other, since there is a high probability of including the true maximum value of the accumulated correlation value in the second phase search range, it is arranged to determine that the second phase search range is appropriate. On the other hand, if the initial code phase and the confirmation code phase do not match with each other, since there is a possibility of not including the true maximum value of the accumulated correlation value in the second phase search range, it is arranged to determine that the second phase search range is inappropriate, and further reset the second phase search range.

According to the process described above, it becomes possible to determine whether or not the second phase search range is appropriate (appropriateness of the second phase search range) based on the processing result of the first correlation accumulation process, thus detection of the wrong code phase in the second correlation accumulation process can be prevented. In particular, in such an environment as an indoor environment in which the positioning signal thus received belongs to a signal in a weak electric field (hereinafter referred to as a "weak electric field environment"), since it is difficult to determine the maximum value of the accumulated correlation value with the correlation accumulation for a short period of time, the method of the present embodiment is effective.

During the period from the first timing to when the elapsed time from when the accumulation is first started in the second correlation accumulation process reaches second threshold time (e.g., "16 seconds," in other words, "32 seconds" after the first correlation accumulation process has started) (hereinafter referred to as "second accumulation time"), the code phase having the maximum accumulated correlation value is continually detected as the pseudo distance code phase in the first correlation accumulation process, and the positioning calculation is executed using the pseudo distance obtained from the pseudo distance code phase. Further, when the second accumulation time reaches the second threshold time, the code phase with the maximum accumulated correlation value is detected in the second correlation accumulation process as the pseudo distance code phase, and is used for the positioning calculation. The positioning calculation is thereafter executed every time the second accumulation time reaches the second threshold time using the processing result of the second correlation accumulation process. It should be noted that the first threshold time and the second threshold time may be the same or different from each other.

In an explanation with reference to FIG. 5, the first correlation accumulation process is started at a time point "T1." Then, at a time point "T2" the second correlation accumulation process is started while continuing the first correlation accumulation process. In a period from the time point "T2" and before a time point "T3," the positioning calculation is executed using the pseudo distance code phase obtained from the processing result of the first correlation accumulation process, while the positioning calculation is executed at the time point "T3" using the pseudo distance code phase obtained from the processing result of the second correlation accumulation process. Further, in a period after the time point "T3" and before a time point "T4," the positioning calculation is executed using the pseudo distance code phase obtained from the processing result of the first correlation accumulation process, while the positioning calculation is executed at the time point "T4" using the pseudo distance code phase obtained from the second correlation accumulation process. The same process is thereafter repeated.

In the present embodiment, it is arranged that the pseudo distance code phase is detected from the processing result of the first correlation accumulation process during the period before the second accumulation time reaches the second threshold time. The reason therefor is that in the weak electric field environment it becomes difficult to discriminate peaks of the accumulated correlation value from the noise if the accumulation time is too short, and therefore, there is a possibility that the code phase is not correctly detected.

Figure 3:
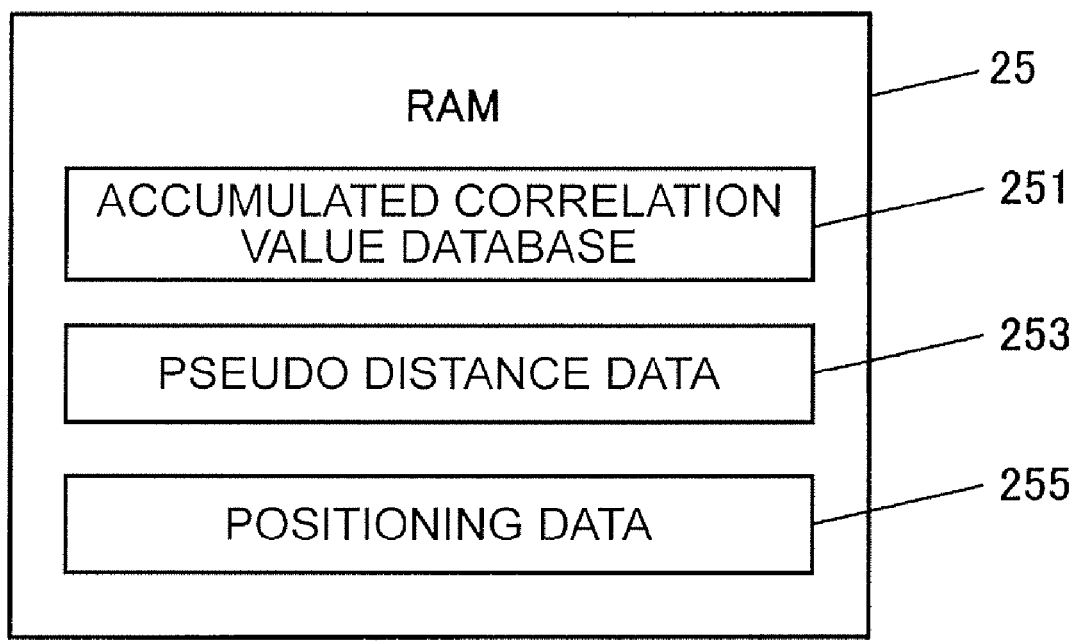
FIG. 3 is a diagram showing an example of data to be stored in a RAM of the baseband processing circuit section.

FIG. 3 is a diagram showing an example of the data to be stored in the RAM 25 in the baseband processing circuit section 20. The RAM 25 stores an accumulated correlation value database 251, pseudo distance data 253, and positioning data 255.

FIG. 6 is a diagram showing an example of a data configuration of the accumulated correlation value database 251. The accumulated correlation value database 251 is data in which first correlation accumulation processing data 2512, second correlation accumulation processing data 2513, a processing status 2514, an appropriateness determining code phase 2515, and a pseudo distance code phase 2516 are stored so as to correspond to each other for each of capturing object satellites 2511, and is updated by the CPU 21 in the baseband process.

The first correlation accumulation processing data 2512 is data used for the first correlation accumulation process, and includes a first accumulated correlation value data table, a first accumulation base time, and the first accumulation time. Similarly, the second correlation accumulation processing data 2512 is data used for the second correlation accumulation process, and includes a second accumulated correlation value data table, a second accumulation base time, and the second accumulation time.

The accumulated correlation value data table in each data is a data table storing the accumulated correlation value in each phase obtained by the correlation accumulation, and is updated as needed in response to the synchronous accumulation process executed every time the correlation value is accumulated. The accumulation base time is a time point used as a base when executing the synchronous accumulation process, and is updated at the latest correlation calculation time point. Therefore, although the correlation accumulation is executed momentarily, the accumulated value always synchronized with the latest correlation calculation time point is obtained. Further, the accumulation time is the elapsed time from when the correlation accumulation has first been started to the present.

The processing status 2514 represents the status of the process in progress, and stores "no process is in progress" if neither the first correlation accumulation process nor the second correlation accumulation process is in progress, "the first process is in progress" if the first correlation accumulation process is solely in progress, and "the first and second processes are in progress" if both of the first and second correlation accumulation processes are in progress.

The appropriateness determining code phase 2515 is a code phase for determining whether or not the second phase search range set presently is appropriate, and includes the initial code phase and the confirmation code phase described above.

The pseudo distance code phase 2516 is a code phase used for calculating the pseudo distance as described above. The code phase is calculated using the accumulated correlation value of either one of the first and second correlation accumulation process provided with the arrow at the time point provided with the arrow shown in FIG. 5.

The pseudo distance data 253 is the data of the pseudo distance calculated for each of the captured satellites, and is updated by the CPU 21 in the baseband process.

The positioning data 255 is the data related to the positioning location obtained by the positioning calculation, and is updated by the CPU 21 in the baseband process.

3. Flow of Process

Figure 7:
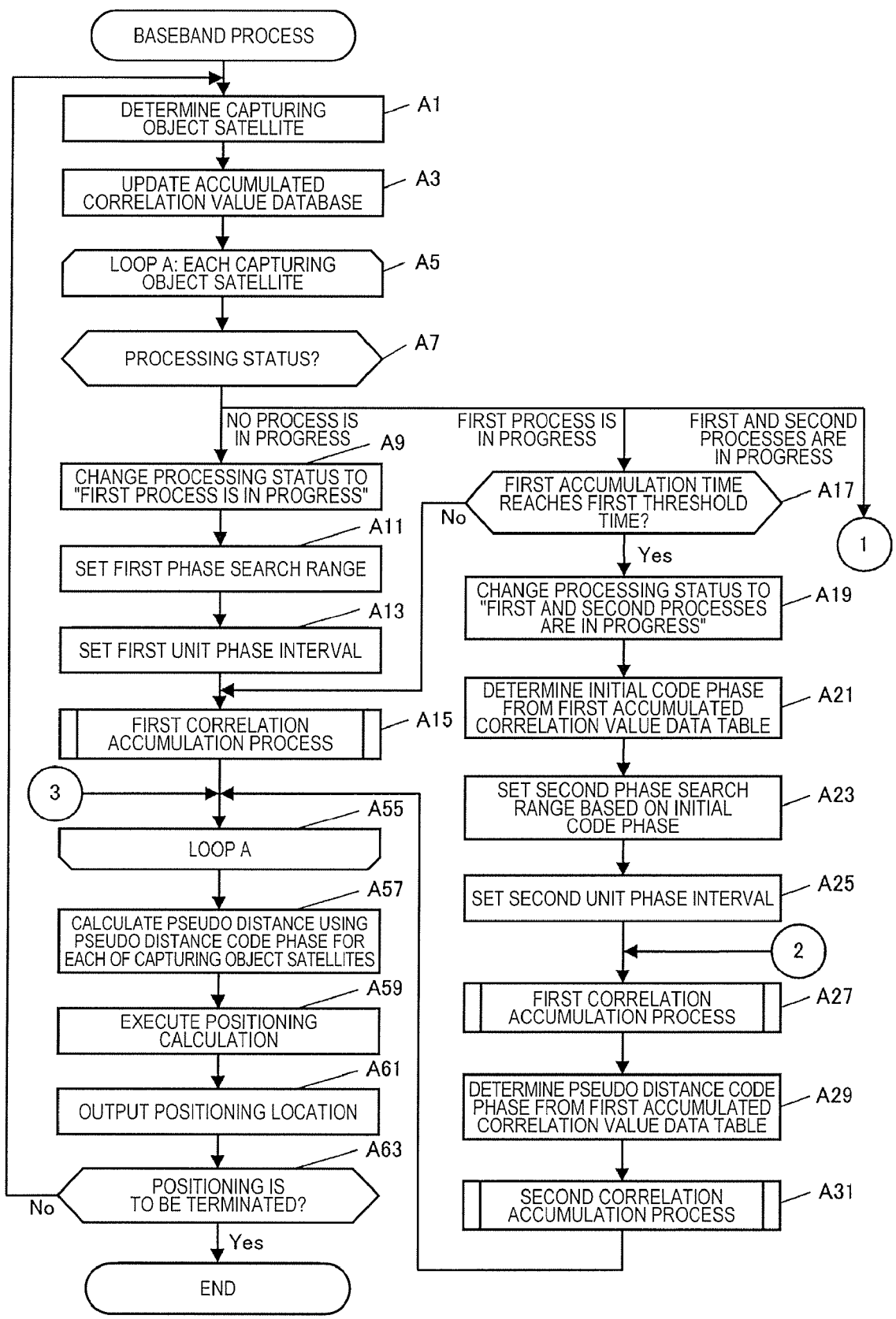
FIG. 7 is a flowchart showing the flow of the baseband process.
Figure 8:
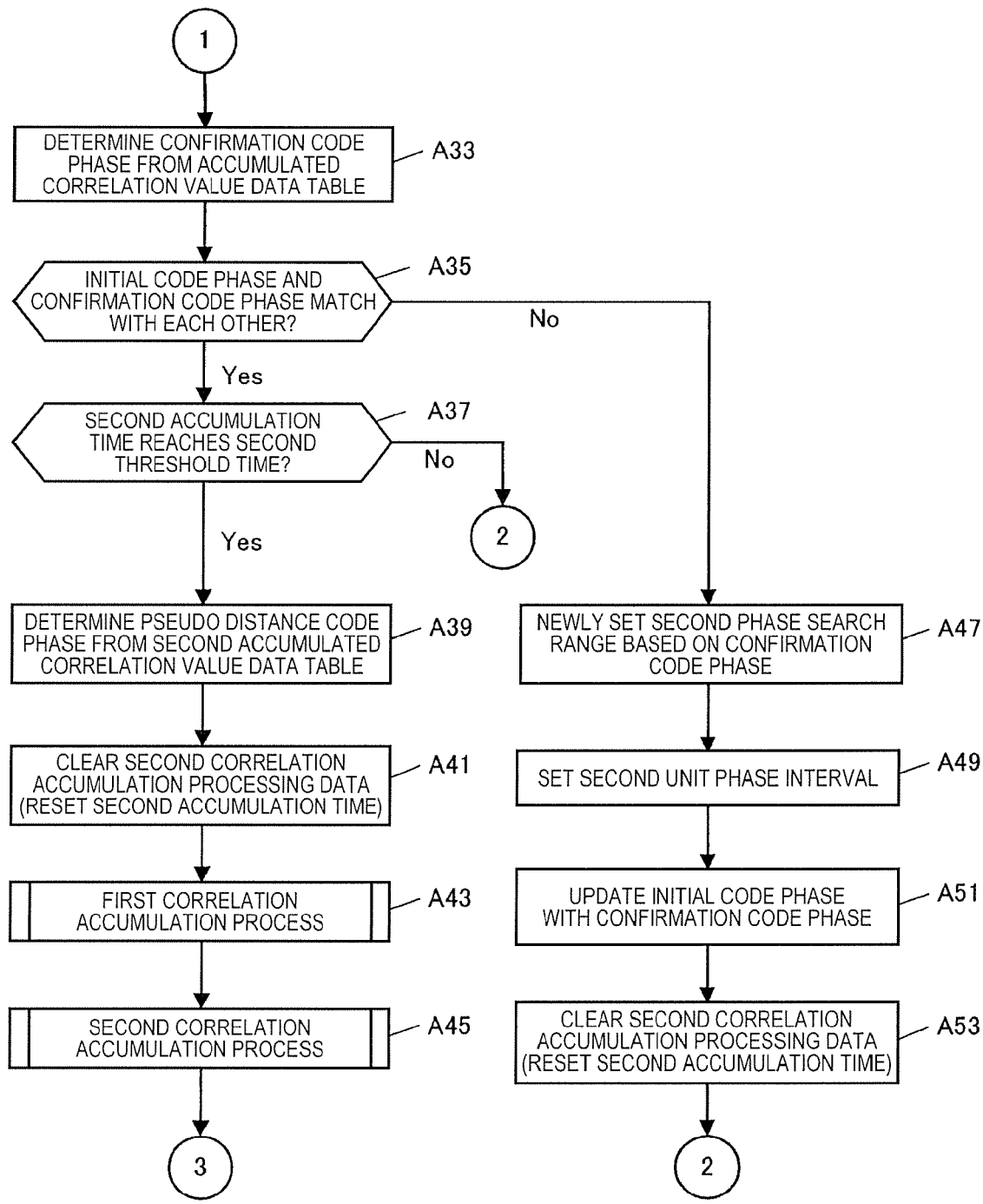
FIG. 8 is a flowchart showing the flow of the baseband process.

FIGS. 7 and 8 are flowcharts showing the flow of the baseband process corresponding to the baseband processing program 231 stored in the ROM 23, then retrieved therefrom by the CPU 21, and executed by the CPU 21 in the portable phone 1.

The baseband process is the process the execution of which is started by the CPU 21 in conjunction with the reception of the GPS satellite signal by the RF receiving circuit section 11 when the CPU 21 detects that the operation of the positioning start instruction is executed on the operation section 40, which is the process executed in parallel to various types of process such as execution of the various application programs. It should be noted that it is also possible to arrange that powering ON and OFF of the portable phone 1 and starting and stopping of the GPS are respectively coupled to each other, and the execution of the baseband process is started when the power ON operation of the portable phone 1 is detected.

Firstly, the CPU 21 determines (step A1) the capturing object satellites based on the latest almanac data and so on. More specifically, the CPU 21 determines the GPS satellite located in the sky of the given tentative present location at the current time measured in a timepiece section, not shown, based on the data such as almanac or ephemeris. The tentative present location is given as, for example, a location of a communication base station of the portable phone or the previous positioning location.

Then, the CPU 21 updates (step A3) the accumulated correlation value database 251 in the RAM 25. Specifically, the CPU 21 deletes the data of the capturing object satellite, which has been determined to be the capturing object satellite at the previous update and is not determined to be the capturing object satellite this time, from the accumulated correlation value database 251, and at the same time, newly adds the data of the capturing object satellite, which has not been determined to be the capturing object satellite at the previous update and is determined to be the capturing object satellite this time, to the accumulated correlation value database 251. Then, the CPU 21 executes the process corresponding to the loop A (steps A5 through A55) for each of the capturing object satellites.

In the loop A, the CPU 21 judges (step A7) the processing status 2514 of the present capturing object satellite stored in the accumulated correlation value database 251. Further, if it is determined that the processing status 2514 is "no process is in progress" (NO PROCESS IS IN PROGRESS in step A7), the CPU 21 changes (step A9) the processing status 2514 of the present capturing object satellite to "the first process is in progress."

Subsequently, the CPU 21 sets (step A11) the first phase search range. The first phase search range can be set to be, for example, the entire 1023 chips, the code length of the PRN code. Further, the CPU 21 sets (step A13) a predetermined phase interval as the first unit phase interval. The first unit phase interval is an interval equal to or shorter than 1 chip, for example, 0.8 chip.

Subsequently, the CPU 21 executes the first correlation accumulation process to update (step A15) the first correlation accumulation processing data 2512 of the accumulated correlation value database 251. Specifically, the CPU 21 executes a process of executing the correlation calculation of the replica code of the present capturing object satellite with the received signal output from the RF receiving circuit section 11 while shifting the phase of the replica code by the first unit phase interval in the first phase search range, and executing the synchronous accumulation on the correlation values thus obtained.

On this occasion, every time the correlation calculation is executed, the CPU 21 updates the first accumulation base time with the time point at which the latest correlation calculation has been executed, and executes the synchronous accumulation process based on the first accumulation base time. It is obvious that the CPU 21 updates the first accumulated correlation value data table based on the accumulated correlation value, the result of the synchronous accumulation process. The first accumulated correlation value data table stores the accumulated correlation values corresponding to the respective phases having the first unit phase intervals therebetween (it should be noted that in a precise sense, since the explanation that the correlation calculation is executed for each frequency of each of the phases is omitted for the sake of succinctness of the explanation, the accumulated correlation value corresponding to each of frequency of each of the phases is stored in the accumulated correlation value data table). Further, the CPU 21 updates the first accumulation time with the elapsed time from when the first correlation accumulation process has been started first. Subsequently, the CPU 21 transfers the process to the next capturing object satellite.

Meanwhile, if it is determined in the step A7 that the processing status 2514 of the present capturing object satellite is "the first process is in progress" (FIRST PROCESS IS IN PROGRESS in step A7), the CPU 21 determines (step A17) whether or not the first accumulation time reaches the first threshold time, and if it is determined that it has not yet reached (No in step A17), the CPU 21 transfers the process to the step A15.

Further, if it is determined in the step A17 that the first accumulation time reaches the first threshold time (Yes in step A17), the CPU 21 changes (step A19) the processing status 2514 of the present capturing object satellite stored in the accumulated correlation value database 251 to "the first and second processes are in progress."

Subsequently, the CPU 21 determines (step A21) the initial code phase from the first accumulated correlation value data table of the first correlation accumulation processing data 2512. Specifically, the CPU 21 looks up the first accumulated correlation value data table to determine the phase having the maximum accumulated correlation value at the present moment as the initial code phase. Then, the CPU 21 stores the initial code phase thus determined into the accumulated correlation value database 251 as the appropriateness determining code phase 2515 of the present capturing object satellite.

Then, the CPU 21 sets (step A23) the second phase search range based on the initial code phase thus determined in the step A21. Specifically, the CPU 21 sets a range of ±0.32 chip centering on the initial code phase, for example, as the second phase search range. Further, the CPU 21 sets (step A25) the second unit phase interval. The second unit phase interval is an interval narrower than the first unit phase interval, and is 0.08 chip, for example.

Subsequently, the CPU 21 executes (step A27) the first correlation accumulation process. Then, the CPU 21 determines (step A29) the pseudo distance code phase from the first accumulated correlation value data table of the first correlation accumulation processing data 2512. Specifically, the CPU 21 looks up the first accumulated correlation value data table to determine the phase having the maximum accumulated correlation value at the present moment as the pseudo distance code phase. Then, the CPU 21 stores the pseudo distance code phase thus determined into the accumulated correlation value database 251 as the pseudo distance code phase 2516 of the present capturing object satellite.

Then, the CPU 21 executes the second correlation accumulation process to update (step A31) the second correlation accumulation processing data 2513 of the accumulated correlation value database 251. Specifically, the CPU 21 executes a process of executing the correlation calculation of the replica code of the present capturing object satellite with the received signal output from the RF receiving circuit section 11 while shifting the phase of the replica code by the second unit phase interval in the second phase search range, and executing the synchronous accumulation on the correlation values thus obtained, and updates the second accumulated correlation value data table. Further, the CPU 21 updates the second accumulation time with the elapsed time from when the second correlation accumulation process has been started. Subsequently, the CPU 21 transfers the process to the next capturing object satellite.

Meanwhile, if it is determined in the step A7 that the processing status 2514 of the present capturing object satellite is "the first and second processes are in progress" (FIRST AND SECOND PROCESSES ARE IN PROGRESS in step A7), the CPU 21 determines (step A33) the confirmation code phase from the first accumulated correlation value data table of the first correlation accumulation processing data 2512. Specifically, the CPU 21 looks up the first accumulated correlation value data table to determine the phase having the maximum accumulated correlation value at the present moment as the confirmation code phase. Then, the CPU 21 stores the confirmation code phase thus determined into the accumulated correlation value database 251 as the appropriateness determining code phase 2515 of the present capturing object satellite.

Subsequently, the CPU 21 determines (step A35) whether or not the initial code phase and the confirmation code phase stored in the appropriateness determining code phase 2515 of the accumulated correlation value database 251 match with each other. Then, if it is determined that they match with each other (Yes in step A35), the CPU 21 determines (step A37) whether or not the second accumulation time reaches the second threshold time, and if it is determined that it has not yet reached (No in step A37), the CPU 21 transfers the process to the step A27.

Further, if it is determined in the step A37 that the second accumulation time reaches the second threshold time (Yes in step A37), the CPU 21 determines (step A39) the pseudo distance code phase from the second accumulated correlation value data table of the second correlation accumulation processing data 2513. Specifically, the CPU 21 looks up the second accumulated correlation value data table to determine the code phase having the maximum accumulated correlation value at the present moment as the pseudo distance code phase. Then, the CPU 21 stores the pseudo distance code phase thus determined into the accumulated correlation value database 251 as the pseudo distance code phase 2516 of the present capturing object satellite.

Subsequently, the CPU 21 clears (step A41) the second correlation accumulation processing data 2513. Specifically, the CPU 21 clears the data of the accumulated correlation value of each of the phases and each of the frequencies stored in the second accumulated correlation value data table, and at the same time, clears the second accumulation base time. Further, the CPU 21 resets the second accumulation time.

Then, the CPU 21 executes the first correlation accumulation process (step A43), and the second correlation accumulation process (step A45). Subsequently, the CPU 21 transfers the process to the next capturing object satellite.

Further, if it is determined in the step A35 that the initial code phase and the confirmation code phase do not match with each other (No in step A35), the CPU 21 newly sets (step A47) the second phase search range based on the confirmation code phase determined in the step A33. Further, the CPU 21 sets (step A49) the second unit phase interval. The method of setting the second phase search range and the second unit phase interval is as described above.

Subsequently, the CPU 21 updates (step A51) the initial code phase of the present capturing object satellite stored in the accumulated correlation value database 251 with the confirmation code phase determined in the step A33. Further, the CPU 21 clears (step A53) the second correlation accumulation processing data 2513, and then transfers the process to the step A27.

After executing the process corresponding to the steps A7 through A53 for all of the capturing object satellites, the CPU 21 terminates (step A55) the loop A. After terminating the loop A, the CPU 21 calculates the pseudo distance between the present capturing object satellite and the portable phone 1 using the pseudo distance code phase 2516 stored in the accumulated correlation value database 251 with respect to each of the capturing object satellites, and stores (step A57) the pseudo distance into the pseudo distance data 253 of the RAM 25.

Then, the CPU 21 performs a predetermined positioning calculation using the pseudo distances stored in the pseudo distance data 253 of the RAM 25, thereby positioning the present location of the portable phone 1 and then storing the positioning location into the positioning data 255 of the RAM 25 (step A59). It should be noted that as the positioning calculation, a method known to the public such as positioning calculation using a least-squares method or positioning calculation using a Kalman filter can be applied.

Subsequently, the CPU 21 outputs (step A61) the positioning location, which is stored in the positioning data 255 of the RAM 25, to the host CPU 30. Then, the CPU 21 determines (step A63) whether or not the positioning is to be terminated, and if it is determined that it is not to be terminated (No in step A63), the CPU 21 returns the process to the step A1. Further, if it is determined that the positioning is to be terminated (Yes in step A63), the CPU 21 terminates the baseband process.

4. Functions and Advantages

According to the present embodiment, the first correlation accumulation process is executed in which the correlation accumulation is executed on the received signal of the GPS satellite signal, on which the spread modulation with the PRN code is executed, and the replica code of the PRN code while shifting the phase of the replica code in the first phase search range. Then, the second phase search range narrower than the first phase search range is set based on the accumulated correlation value at the first timing in the first correlation accumulation process. Then, the second correlation accumulation process is executed in which the correlation accumulation is executed on the received signal and the replica code while shifting the phase of the replica code in the second phase search range, and appropriateness of the second phase search range thus set is determined based on the accumulated correlation value of the first correlation accumulation process at the first timing and the accumulated correlation value of the first correlation accumulation process at the second timing subsequent to the first timing. Then, if it is determined to be appropriate, the predetermined positioning calculation using the processing result of the second correlation accumulation process is executed to perform positioning.

Specifically, the timing at which the first threshold time has elapsed from when the first correlation accumulation process has started is set to be the first timing, and arbitrary timing subsequent to the first timing is set to be the second timing. Then, whether or not the phase (the initial code phase) with the maximum accumulated correlation value of the first correlation accumulation process at the first timing and the phase (the confirmation code phase) with the maximum accumulated correlation value of the first correlation accumulation process at the second timing match with each other is determined, and if it is determined that they match with each other, it is determined that the second phase search range thus set is appropriate, and the processing result of the second correlation accumulation process is used for the positioning calculation.

On the other hand, if the initial code phase and the confirmation code phase do not match with each other, there is a possibility that the maximum value of the accumulated correlation value at the first timing is not the true maximum value, and the second phase search range fails to include the phase with the maximum accumulated correlation value. Therefore, on this occasion, it is determined that the second phase search range thus set is inappropriate, and the processing result of the second correlation accumulation process is not used for the positioning calculation. By executing such a process as described above, it becomes possible to accurately determine appropriateness of the range in which the search of the phase is presently in progress, thereby realizing the positioning with high accuracy based on the accurate processing result.

Further, in the present embodiment, it is arranged that the code phase is detected based on the accumulated correlation value obtained as needed by the first correlation accumulation process after the first timing until the second phase search range is determined to be appropriate and the second accumulation time reaches the second threshold time, and the positioning calculation using the code phase is executed to position the present location. Thus, it becomes possible to continuously perform the positioning using the processing result of the first correlation accumulation process in a complementary manner even in the period in which the processing result of the second correlation accumulation process is not available.

5. Modified Examples

5-1. Electronic Apparatus

Although in the embodiment described above, the explanations are presented exemplifying a portable phone as an electronic apparatus equipped with the positioning device, the electronic apparatus to which the invention may be applied is not limited thereto. The invention may also be applied to electronic apparatuses such as a laptop computer or a personal digital assistant (PDA) equipped with the positioning device, or a vehicle navigation system.

5-2. Satellite Positioning System

Further, although in the embodiment described above, the example of applying the invention to the GPS as the satellite positioning system is explained, it is also possible to apply the invention to other satellite positioning systems such as Wide Area Augmentation System (WAAS), Quasi Zenith Satellite System (QZSS), GLObal NAvigation Satellite System (GLONASS), or GALILEO.

5-3. Split Processing

It is possible to arrange that the host CPU 30 executes a part or the whole of the processing to be executed by the CPU 21. For example, the CPU 21 executes the first correlation accumulation process and the second correlation accumulation process to detect the pseudo distance code phase, and outputs it to the host CPU 30. Then, the host CPU 30 calculates the pseudo distance based on the pseudo distance code phase input from the CPU 21, and executes the positioning calculation using the pseudo distance thus calculated. Further, it is also possible to arrange that the host CPU 30 executes the entire process including the first correlation accumulation process and the second correlation accumulation process.

5-4. Correlation Accumulation Section

Although in the embodiment described above the explanations are presented assuming that the CPU 21 executes the correlation accumulation processes to realize the detection of the code phase with software, it is also possible to separately provide a correlation accumulation section as a circuit section for executing the correlation accumulation to the baseband processing circuit section 20, thereby realizing the detection of the code phase with hardware. In this case, it is preferable to prepare a channel for executing the first correlation accumulation and a channel for executing the second correlation accumulation, and execute the correlation accumulations in parallel to each other.

5-5. Correlation Accumulation Process

Although in the embodiment described above the explanations are presented assuming that the code phase is detected by two types of correlation accumulation processes, namely the first and second correlation accumulation processes, it is also possible to detect the code phase with three or more types of correlation accumulation processes. In this case, it is arranged that the phase search range and the unit phase interval are gradually reduced as the order of the correlation accumulation process becomes higher, thereby more finely performing the search of the code phase.

Further, the lower order correlation accumulation process is continuously executed during the period in which the higher order correlation accumulation process is executed, and the appropriateness of the phase search range of the higher order correlation accumulation process is determined based on the processing result of the lower order correlation accumulation process. Specifically, when determining the appropriateness of the phase search range in the nth correlation accumulation process, whether or not the initial code phase and the confirmation code phase detected in the n−1th correlation accumulation process match with each other is determined, and if it is determined that they match with each other, it is determined that the phase search range thus set is appropriate.

5-6. Pseudo Distance Code Phase

In the embodiment described above, the explanations are presented assuming that the pseudo distance code phase is detected as needed from the processing result of the first correlation accumulation process and used for the positioning calculation during the period before the second accumulation time reaches the second threshold time. This is because in the weak electric field environment it is difficult to discriminate the peak of the accumulated correlation value from the noise if the accumulation time is too short. However, it is also possible to arrange that even in such a period the pseudo distance code phase is detected as needed from the processing result of the second correlation accumulation process, and is used for the positioning calculation. Specifically, in FIG. 5, in the period from the time point "T2" to the time point "T3" or the period from the time point "T3" to the time point "T4," the pseudo distance code phase is detected as needed from the processing result during the second correlation accumulation process, and the positioning calculation is executed using the pseudo distance calculated based on the pseudo distance code phase thus detected.

Further, it is also possible to arrange that a process (a so-called propagation process) of making a forecast of the pseudo distance code phase at each of the positioning time points from the pseudo distance code phase at the time point (hereinafter referred to as a "base time") at which the second accumulation time reaches the second threshold time is executed, and the positioning calculation is executed using the pseudo distance code phase thus forecasted. Specifically, in FIG. 5, in the period from the time point "T3" and before the time point "T4" the pseudo distance code phase at each of the positioning time points is forecasted using the pseudo distance code phase obtained from the processing result of the second correlation accumulation process at the base time "T3," and the positioning calculation is executed using the pseudo distance calculated based on the pseudo distance code phase thus forecasted.

The forecast of the pseudo distance code phase is executed as follows. Specifically, the variation in the frequency of the GPS satellite signal per unit time is multiplied by the elapsed time from the base time to the positioning time, thereby obtaining the forecasted variation of the pseudo distance code phase in the elapsed time. Then, the value obtained by adding the forecasted variation thus obtained to the pseudo distance code phase at the base time is taken as the forecasted pseudo distance code phase at the positioning time.

5-7. Phase Search Range

Although in the embodiment described above, the explanations are presented assuming that the entire chip length of the PRN code is set as the first phase search range, in the case in which the detection of the code phase has already been executed in the previous phase search, it is also possible to arrange that the predetermined range (e.g., a range of ±8 chips centering on the detected code phase) including the present code phase is set as the first phase search range, thereby executing the first correlation accumulation process with the phase search range narrower than the first phase search range in the initial state.

Further, although in the embodiment described above, the explanations are presented assuming that the range centering on the initial code phase and having a predetermined width is set as the second phase search range, any range including the initial code phase can be adopted, and it is not necessarily required to have the initial code phase at the center of the second phase search range.

5-8. Approximation Conditions

Although in the embodiment described above the explanations are presented assuming that it is determined that the second phase search range is appropriate if the initial code phase and the confirmation code phase match with each other, it is also possible to determine that the second phase search range is appropriate if the initial code phase and the confirmation code phase do not completely match with each other, but approximate to each other (e.g., the difference between the initial code phase and the confirmation code phase is within a range of ±3 chips).

What is claimed is:

1. A positioning method executed on an electric device, comprising:
    executing a first correlation accumulation process adapted to execute a correlation accumulation on a received signal, a positioning signal spread-modulated with a spread code, and a replica code of the spread code while shifting a phase of the replica code in a first phase search range;
    setting a second phase search range narrower than the first phase search range based on an accumulated correlation value at a first timing in the first correlation accumulation process;
    executing a second correlation accumulation process adapted to execute a correlation accumulation on the received signal and the replica code while shifting the phase of the replica code in the second phase search range;
    determining appropriateness of the second phase search range set in the setting step, based on the accumulated correlation value at the first timing and an accumulated correlation value at a second timing that is subsequent to the first timing in the first correlation accumulation process; and
    positioning by executing a predetermined positioning calculation using a processing result of the second correlation accumulation process, if the second phase search range is determined appropriate;
    positioning by executing the predetermined positioning calculation based on an accumulated correlation value in the first correlation accumulation process after the first timing, until the second phase search range is determined appropriate in the determining step; and
    newly setting the second phase search range based on an accumulated correlation value in the first correlation accumulation process, if the second phase search range is determined inappropriate in the determining step,
    the first correlation accumulation process being a process of executing the correlation accumulation while shifting the phase of the replica code by a first unit phase interval,
    the second correlation accumulation process being a process of executing the correlation accumulation while shifting the phase of the replica code by a second unit phase interval narrower than the first unit phase interval,
    the determining appropriateness of the second phase search range being based on whether or not a phase with a maximum accumulated correlation value at the first timing and a phase with a maximum accumulated correlation value at the second timing in the first correlation accumulation process satisfy a predetermined approximation condition.

2. The positioning method according to claim 1, wherein in the setting step, a predetermined range including a phase with a maximum accumulated correlation value of the first correlation accumulation process is set as the second phase search range.

3. The positioning method according to claim 1, wherein the setting the second phase search range narrower than the first phase search range based on the accumulated correlation value at the first timing within the first correlation accumulation process includes setting the second phase search range in the first search range.

4. A non-transitory computer readable medium including a program allowing a computer incorporated in a positioning device to execute a positioning method comprising:
    executing a first correlation accumulation process adapted to execute a correlation accumulation on a received signal, a positioning signal spread-modulated with a spread code, and a replica code of the spread code while shifting a phase of the replica code in a first phase search range;
    setting a second phase search range narrower than the first phase search range based on an accumulated correlation value at a first timing in the first correlation accumulation process;
    executing a second correlation accumulation process adapted to execute a correlation accumulation on the received signal and the replica code while shifting the phase of the replica code in the second phase search range;
    determining appropriateness of the second phase search range set in the setting step, based on the accumulated correlation value at the first timing and an accumulated correlation value at a second timing that is subsequent to the first timing in the first correlation accumulation process; and
    positioning by executing a predetermined positioning calculation using a processing result of the second correlation accumulation process, if the second phase search range is determined appropriate;
    positioning by executing the predetermined positioning calculation based on an accumulated correlation value in the first correlation accumulation process after the first timing, until the second phase search range is determined appropriate in the determining step; and
    newly setting the second phase search range based on an accumulated correlation value in the first correlation accumulation process, if the second phase search range is determined inappropriate in the determining step,
    the first correlation accumulation process being a process of executing the correlation accumulation while shifting the phase of the replica code by a first unit phase interval,
    the second correlation accumulation process being a process of executing the correlation accumulation while shifting the phase of the replica code by a second unit phase interval narrower than the first unit phase interval, the determining appropriateness of the second phase search range being based on whether or not a phase with a maximum accumulated correlation value at the first timing and a phase with a maximum accumulated correlation value at the second timing in the first correlation accumulation process satisfy a predetermined approximation condition.

5. The non-transitory computer readable medium including the program allowing the computer incorporated in the positioning device according to claim 4, wherein the setting the second phase search range narrower than the first phase search range based on the accumulated correlation value at the first timing in the first correlation accumulation process includes setting the second phase search range within the first phase search range.

6. A positioning device comprising:

a first correlation accumulation processing section adapted to execute a first correlation accumulation process of executing a correlation accumulation on a received signal, a positioning signal spread-modulated with a spread code, and a replica code of the spread code while shifting a phase of the replica code in a first phase search range;

a phase search range setting section adapted to set a second phase search range narrower than the first phase search range based on an accumulated correlation value at a first timing in the first correlation accumulation process;

a second correlation accumulation processing section adapted to execute a second correlation accumulation process of executing a correlation accumulation on the received signal and the replica code while shifting the phase of the replica code in the second phase search range;

a determination section adapted to determine appropriateness of the second phase search range set by the phase search range setting section, based on the accumulated correlation value at the first timing and an accumulated correlation value at a second timing in the first correlation accumulation process; and a positioning section adapted to position by executing a predetermined positioning calculation using a processing result of the second correlation accumulation process, if the second phase search range is determined appropriate, and adopted to position by executing the predetermined positioning calculation based on an accumulated correlation value in the first correlation accumulation process after the first timing, until the second phase search range is determined appropriate in the determining step; and the phase search range setting section adapted to newly set the second phase search range based on an accumulated correlation value in the first correlation accumulation process, if the second phase search range is determined inappropriate in the determining step, the first correlation accumulation process being a process of executing the correlation accumulation while shifting the phase of the replica code by a first unit phase interval, the second correlation accumulation process being a process of executing the correlation accumulation while shifting the phase of the replica code by a second unit phase interval narrower than the first unit phase interval, the determining appropriateness of the second phase search range being based on whether or not a phase with a maximum accumulated correlation value at the first timing and a phase with a maximum accumulated correlation value at the second timing in the first correlation accumulation process satisfy a predetermined approximation condition.

7. The positioning device according to claim 6, wherein the phase search range setting section is adapted to set the second phase search range within the first phase search range.

* * * * *